United States Patent
Hashimoto et al.

(10) Patent No.: US 9,344,507 B2
(45) Date of Patent: May 17, 2016

(54) METHOD OF PROCESSING WEB ACCESS INFORMATION AND SERVER IMPLEMENTING SAME

(75) Inventors: Sayako Hashimoto, Kawasaki (JP); Kazuo Tomono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 537 days.

(21) Appl. No.: 13/427,208

(22) Filed: Mar. 22, 2012

(65) Prior Publication Data

US 2012/0311140 A1 Dec. 6, 2012

(30) Foreign Application Priority Data

May 30, 2011 (JP) .................................. 2011-121056

(51) Int. Cl.
*G06F 17/30* (2006.01)
*H04L 29/08* (2006.01)
*G06F 15/173* (2006.01)
*G06Q 30/02* (2012.01)

(52) U.S. Cl.
CPC ............. *H04L 67/22* (2013.01); *G06F 15/173* (2013.01); *G06Q 30/02* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2005/0120311 | A1* | 6/2005 | Thrall | G06F 17/30867 715/811 |
| 2006/0038015 | A1 | 2/2006 | Ise et al. | |
| 2006/0064411 | A1* | 3/2006 | Gross | G06F 17/30864 |
| 2007/0255702 | A1* | 11/2007 | Orme | G06F 17/30696 |
| 2009/0157612 | A1* | 6/2009 | Su | G06Q 30/02 |
| 2009/0171943 | A1* | 7/2009 | Majumder | G06F 17/30864 |
| 2009/0259646 | A1* | 10/2009 | Fujita | G06F 17/3064 |
| 2011/0029511 | A1* | 2/2011 | Kodialam | G06F 17/30722 707/726 |
| 2011/0106799 | A1* | 5/2011 | Barkai | G06F 3/0604 707/732 |
| 2012/0042264 | A1* | 2/2012 | Burckart et al. | 715/753 |
| 2012/0137201 | A1* | 5/2012 | White | G06F 17/30899 715/205 |
| 2012/0158724 | A1* | 6/2012 | Mahadevan | G06F 17/30873 707/737 |
| 2012/0284597 | A1* | 11/2012 | Burkard | G06F 17/30902 715/205 |

FOREIGN PATENT DOCUMENTS

| | | |
|---|---|---|
| JP | 2000-293423 | 10/2000 |
| JP | 2001-188792 | 7/2001 |
| JP | 2002-092025 | 3/2002 |
| JP | 2003-308339 | 10/2003 |
| JP | 2003-337775 | 11/2003 |

(Continued)

OTHER PUBLICATIONS

JPOA—Office Action dated Sep. 24, 2014 issued with respect to the basic Japanese Patent Application No. 2011-121056 with partial English translation.

(Continued)

*Primary Examiner* — Natisha Cox
(74) *Attorney, Agent, or Firm* — Fujitsu Patent Center

(57) ABSTRACT

A server includes an operation number counting part configured to count the number of operations on a link on a Web page; an operation ratio predicted value calculating part configured to calculate the predicted value of the ratio of the operations of the link based on the Web page; and a link prominence determining part configured to determine the prominence of the link based on the number of the operations and the predicted value of the ratio of the operations.

17 Claims, 14 Drawing Sheets

(56) References Cited

FOREIGN PATENT DOCUMENTS

| | | |
|---|---|---|
| JP | 2004-348241 | 12/2004 |
| WO | WO-2004/097654 | 11/2004 |

OTHER PUBLICATIONS

JPOA—Office Action mailed on Apr. 21, 2015 issued with respect to the basic Japanese Patent Application No. 2011-121056, with partial English translation.

* cited by examiner

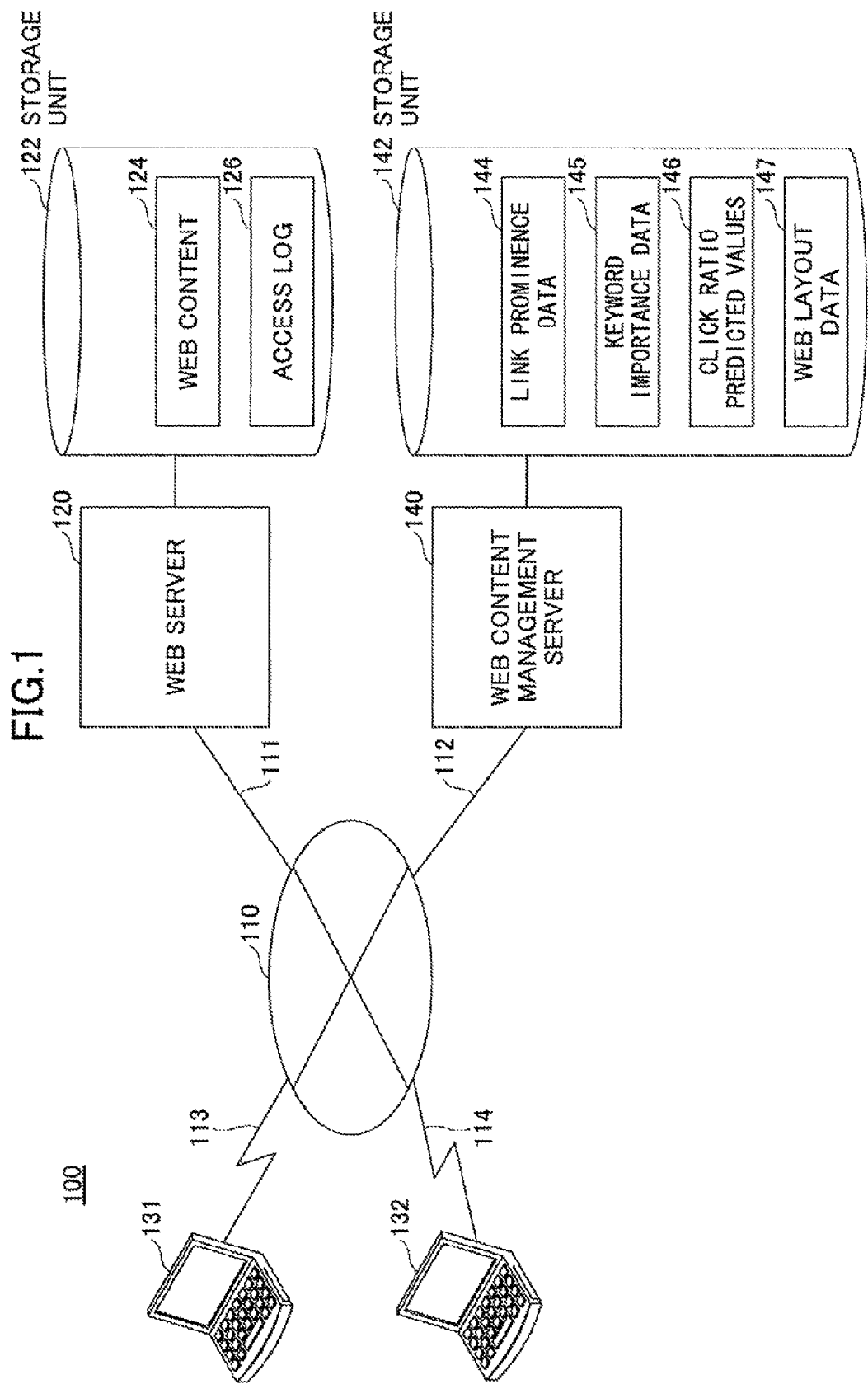

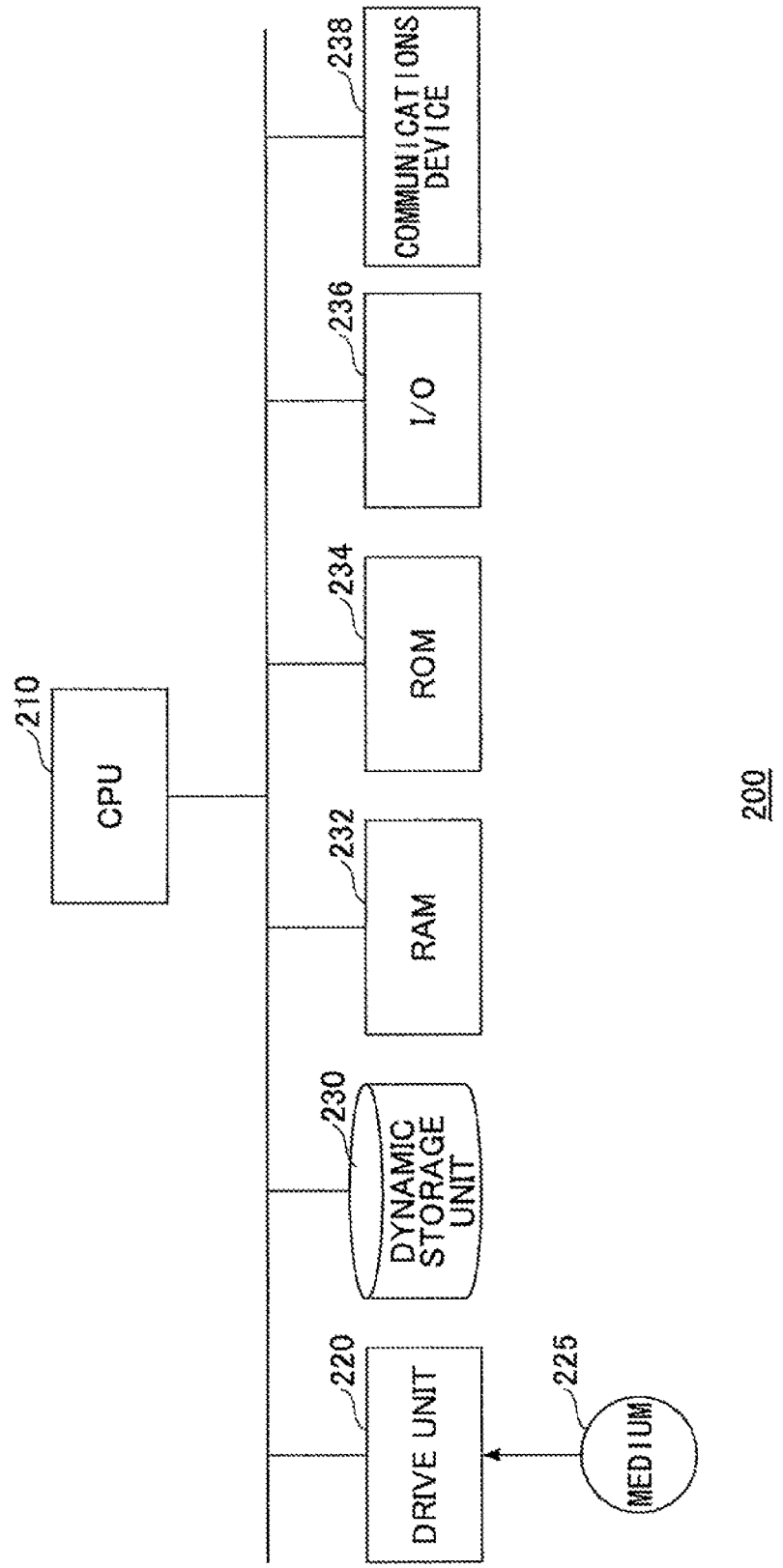

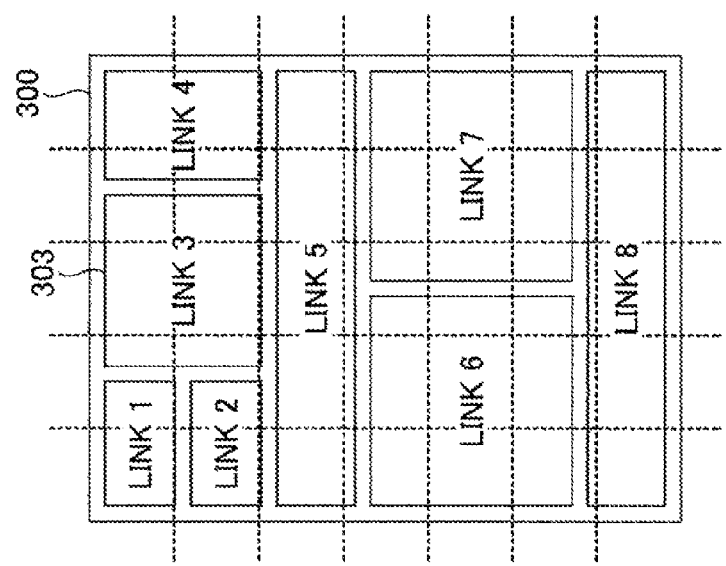

METHOD OF PROCESSING WEB ACCESS INFORMATION AND SERVER IMPLEMENTING SAME

CROSS-REFERENCE TO RELATED APPLICATION

This application is based upon and claims the benefit of priority of the prior Japanese Patent Application No. 2011-121056, filed on May 30, 2011, the entire contents of which are incorporated herein by reference.

FIELD

A certain aspect of the embodiment discussed herein is related to processing information on Web access.

BACKGROUND

Various types of content are provided with Web pages. Therefore, it is desired that content that suits users' preferences be selected and suitably provided. For this purpose, it is desired to understand content or keywords that match users' preferences. Further, in the case of providing the same content, it is desired to design a Web page that matches users' preferences.

Therefore, a technique is known that measures the state of actually viewing content on a client and calculates the rate of use of the content. (See, for example, International Publication Pamphlet No. WO 2004/097654.) This calculates the rate of use of content based on the size of the Web browser of the client, the size of the content, and the number of clicks on the client. Alternatively, the rate of use of content is calculated based on the amount of operation of a scroll bar on the Web browser of the client and the size of the Web browser.

Further, a technique is known that obtains a text on which a particular operation has been performed from where the particular operation has been performed in Web content displayed by a Web browser. (See, for example, Japanese Laid-open Patent Publication No. 2001-188792.) According to this technique, the obtained text is transmitted to another system that uses the text. Then, for example, a system that conducts a Web viewer rating survey or a search engine receives this obtained text and uses the obtained text to provide information on what users have been interested in.

Further, a technique is known that determines an area displayed by a user or a region in a page on the World Wide Web traced with a mouse by the user and extracts text information included in the area or region as a search (retrieval) key when the user is viewing the Web page. (See, for example, Japanese Laid-open Patent Publication No. 2004-348241.) This extracted text information is transmitted to an information processing server. The information processing server searches advertisements using information received from a noticed text extracting part and the user preference information prestored in a preference information database, and creates a page for displaying an advertisement using the results of the search. The created page for displaying an advertisement is transmitted to the advertisement display part of an advertisement display browser, and an advertisement is displayed.

Further, a technique is known that records keywords viewed by a user (user keywords) from the contents viewed by the user. (See, for example, Japanese Laid-open Patent Publication No. 2003-308339.) According to this technique, the evaluation points of user keywords are stored in a keyword database on a user keyword basis, and contents are displayed on the computer terminals of individual users in descending order of evaluation points based on the evaluation points of the user keywords in the keyword database.

SUMMARY

According to an aspect of the invention, a server includes an operation number counting part configured to count a number of operations on each of links on a Web page; an operation ratio predicted value calculating part configured to calculate a predicted value of a ratio of the operations of each link based on the Web page; a link prominence determining part configured to determine a prominence of each link based on the number of the operations and the predicted value of the ratio of the operations; and a layout changing part configured to, in response to detection of a first link having the prominence higher than the prominence of a second link among the links on the Web page, interchange a position at which the first link is operated and a position at which the second link is operated.

According to an aspect of the invention, a method of processing Web access information includes counting, by a computer processor, a number of operations on each of links on a Web page; calculating, by the computer processor, a predicted value of a ratio of the operations of each link based on the Web page; determining, by the computer processor, a prominence of each link based on the number of the operations and the predicted value of the ratio of the operations; and interchanging, by the computer processor, in response to detection of a first link having the prominence higher than the prominence of a second link among the links on the Web page, a position at which the first link is operated and a position at which the second link is operated.

According to an aspect of the invention, a non-transitory computer-readable recording medium has an executable program recorded thereon, wherein the program instructs a computer processor to perform counting a number of operations on each of links on the Web page; calculating a predicted value of a ratio of the operations of each link based on the Web page; determining a prominence of each link based on the number of the operations and the predicted value of the ratio of the operations; and interchanging, in response to detection of a first link having the prominence higher than the prominence of a second link among the links on the Web page, a position at which the first link is operated and a position at which the second link is operated.

The object and advantages of the embodiment will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIG. 1 is a diagram illustrating a system configuration according to an embodiment;

FIG. 2 is a diagram illustrating a hardware configuration of a server according to the embodiment;

FIGS. 4A through 4C are diagrams illustrating the case of calculating click ratio predicted values by dividing the Web page according to the embodiment;

DESCRIPTION OF EMBODIMENT

Figure 3A:
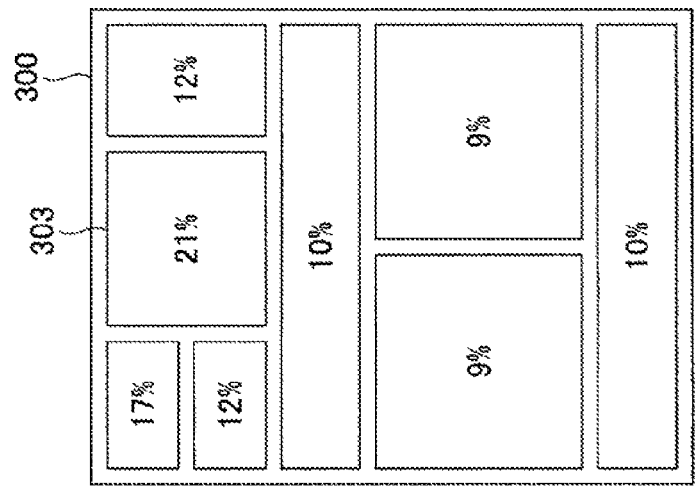
FIGS. 3A through 3C are diagrams illustrating the number of clicks and the click ratio of each of links on a Web page according to the embodiment.

Users often access Web pages for reasons other than their preferences, such as the ease of clicking based on the layout and the visual impression of Web pages. However, the above-described techniques fail to take such factors other than users' preferences into consideration, thus being insufficient in terms of accuracy for determining content that suits users' preferences.

According to an aspect of the invention, it is possible to more accurately determine content that suits users' preferences.

A preferred embodiment of the present invention will be explained with reference to accompanying drawings.

In the following embodiment, a term "click (clicking)" is used as an example of an operation (activity). The "operation" refers to "clicking" in the case of a mouse and "tapping" in the case of a touchscreen panel. Further, if a focus is shifted onto a desired link (or button) using the Tab key and the Enter key is pressed with the focus being on the desired link on a Web page, the same processing is performed as in the case of performing clicking with a mouse. Accordingly, embodiments of the present invention are not limited to clicking with a mouse and may be applied to any "operation" using a user interface.

FIG. 1 is a diagram illustrating a system 100 according to the embodiment. The system 100 includes a Web server 120, a Web content management server 140, a client 131, a client 132, and a network 110 such as the Internet. A storage unit 122 is connected to (or included in) the Web server 120, and a storage unit 142 is connected to (or included in) the Web content management server 140. The Web server 120, the Web content management server 140, the client 131, and the client 132 are connected to the network 110 by lines 111, 112, 113, and 114, respectively. The clients 131 and 132 may be connected wirelessly to the network 110.

The Web server 120 provides a Web page to the client 131 and/or the client 132 via the network 110 using Web content 124 stored in the storage unit 122. Further, the Web server 120 stores various events related to access to the Web content 124 in an access log 126. The access log 126 may be provided to the Web content management server 140.

The Web content management server 140 may calculate the degree of attraction, or the prominence, of multiple links included in the Web content 124 made public by the Web server 120, and store the calculated prominence in the storage unit 142 as link prominence data 144. Further, the Web content management server 140 may calculate the importance of keywords included in the Web content 124 or keywords in the content indicated by links in the Web content 124, and store the calculated importance in the storage unit 142 as keyword importance data 145. The Web content management server 140 may use the information of the access log 126 to perform the above-described calculations. Further, the predicted values of the clicking ratios of the links of the Web content 124 may be stored in the storage unit 142 as clicking ratio predicted values 146. Further, Web content layouts customized for respective users may be stored in the storage unit 142 as Web layout data (information) 147. A description is given in more detail below of the above-described data and processing.

The Web server 120 and the Web content management server 140 do not necessarily have to be separate servers. The above-described various functions of the Web server 120 and the Web content management server 140 may be implemented in a single server. Further, in this embodiment, part of the functions and data described as being provided in or associated with the Web server 120 may be provided in or associated with the Web content management server 140, and part of the functions and data described as being provided in or associated with the Web content management server 140 may be provided in or associated with the Web server 120. Further, with respect to data, each of the Web server 120 and the Web content management server 140 may have a copy of the data.

Examples of the client 131 include apparatuses having a network connecting function, such as personal computers, cellular phones, multifunctional phones, and tablet computers.

FIG. 2 is a block diagram illustrating a hardware configuration 200 of each of the Web server 120 and the Web content management server 140 according to this embodiment. Each of the Web server 120 and the Web content management server 140 includes a central processing unit (CPU) 210, a drive unit 220 configured to read and write a machine-readable (computer-readable) recording medium 225, a dynamic storage unit 230 such as a hard disk drive (HDD), a random access memory (RAM) 232, a read-only memory (ROM) 234, an input/output (I/O) interface 236, and a communications device 238 for communications via the network 110.

The below-described functions may be virtually implemented by the CPU 210 reading and executing an appropriate program loaded into the RAM 232, for example.

According to this embodiment, the program may be stored (recorded) in the machine-readable recording medium 225. Examples of the machine-readable recording medium 225 include magnetic recording media, optical disks, magneto-optical recording media, and semiconductor memories. Examples of magnetic recording media include HDDs, flexible disk (FD)s, and magnetic tape (MT)s. Examples of optical disks include a digital versatile disk (DVD), a DVD-RAM, a compact disk read-only memory (CD-ROM), a compact disk-recordable (CD-R), and a compact disk-rewritable (CD-RW). Examples of magneto-optical recording media include a magneto-optical (MO) disk. Examples of semiconductor memories include flash memories such as SD cards.

A description is given of determination of link prominence.

Figure 3B:
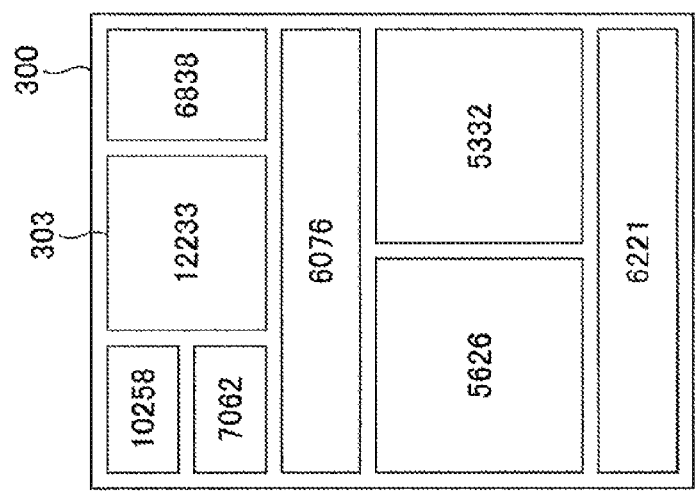
Figure 3C:
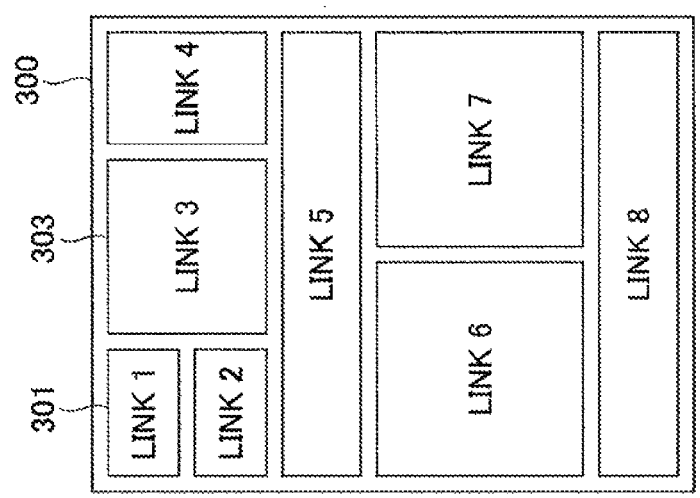

FIGS. 3A, 3B and 3C are diagrams illustrating an example of the number of clicks measured with respect to each of links and the clicking ratios of the links. FIG. 3A illustrates a layout of a Web page 300, where Link 1 through Link 8 are pasted to their respective regions. For example, if a user clicks on a region 303 of Link 3, a Web browser causes a Uniform Resource Locator (URL) assigned to Link 3 (for example, a hyperlink) to be displayed on a display. Links may also cause video to be displayed or cause a desired application to be activated by activating a script in addition to simply causing the embedded URL to be displayed.

FIGS. 3A through 3C illustrate the number of clicks in each of the regions in the Web page 300. For example, FIG. 3B illustrates that the number of clicks in the region 313 of Link 3 is 12233. From these numbers of clicks as illustrated in FIG. 3B, the number of clicks made by all users who have viewed the Web page 300, the number of clicks made by a particular group of users (for example, female users, male users, users of a particular age group, or users accessing the Web page 300 within a particular time period), and/or the number of clicks made by a particular user may be obtained. Information on clicking on a particular link may be obtained by analyzing the access log of the Web page 300 and the access log of the linked Web page (the destination of the link). A script may be written in the Web page 300 that collects events of clicking on the links, and the event information may be transmitted to, for example, the Web content management server 140. A user may be identified by causing the user to enter her/his user ID and password to cause a target page to be displayed. Further, a user group (a group of one or more users) may be identified by prompting users to enter necessary information (gender, date of birth, years of personal computer use experience, category of business, etc.) at the time of registering a user ID and a password. Further, using a cookie or the like stored on a client machine makes it possible to identify an individual to some extent without her/his entering her/his user ID and password after her/his user ID and password are entered once.

FIG. 3C illustrates the clicking ratio of each of the regions of the Web page 300. For example, the clicking ratio of the region 303, that is, the ratio of the number of clicks on Link 3 to the number of clicks of the entire Web page 300 is 21%. This clicking ratio may be calculated by dividing the number of clicks of the region 303 of Link 3, 12233, by the total number of clicks of the Web page 300. The clicking ratios of the individual regions may be summed up to 100%. In the non-limiting example of FIGS. 3A through 3C, the ratio of the number of clicks of each region is calculated based on the number of clicks of the entire Web page 300. Alternatively, for example, a focus may be on a particular user, and the clicking ratio of each region may be calculated with the number of clicks of the particular user being given more weight than the numbers of clicks of other users.

FIGS. 4A, 4B and 4C are diagrams illustrating an example for dividing a Web page and calculating the predicted values of clicking ratios. FIG. 4A illustrates a case where the Web page 300 is divided into 35 equal parts. The Web page is divided to simplify the calculation of the predicted values of clicking ratios. The number of parts into which the Web page is divided and how the Web page is divided may be changed as desired. In this embodiment, these divided areas (parts) may be referred to as "squares", which do not have to be square in shape. On the other hand, areas that define respective links may be referred to as "regions" (see the region 303 of Link 3 in FIGS. 3A through 3C and FIG. 4A), and are distinguished from the "squares".

FIG. 4B is a diagram in which the ease of clicking, or clickability, is expressed in percentage (%) using Fitts's UI law. Fitts's UI law is that an object more remote from the current position of a mouse pointer and smaller in size is generally less easy to click. In the case of FIG. 4B, a square 410 positioned slightly above the page center is determined as the easiest to click, and is given a value of 100%. Then, squares more distant from the square 410 are given smaller values in accordance with the traveling distance of the mouse pointer. These values related to clickability may be fixed in advance.

Referring to FIG. 4C, squares with higher contrast ratios between square color and page background color are given higher clicking ratio predicted values. This is based on the human behavioral pattern that users are more likely to be caused to perform clicking on squares with higher contrast ratios, which are more likely to attract users' attention.

For example, it is assumed that the value is 0% for white square color (RGB: 0xFFF) and is 100% for black square color (RGB: 0x000) when the background color is white. Then, for example, a color that occupies the largest part of a square is employed as the color of the square. For example, if the color of a square is 0x800, the square may be given a value of 50%.

Figure 5:
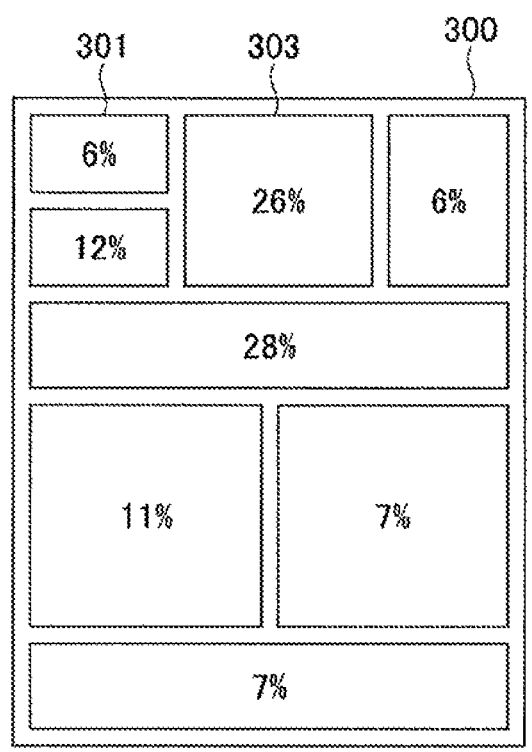
FIG. 5 is a diagram illustrating the result of calculating the click ratio predicted values on a link basis according to the embodiment.

FIG. 5 is a diagram illustrating an example of the results of calculating the click ratio predicted values of links. In this example, the degree of clickability determined in FIG. 4B is multiplied by the degree of clickability determined in FIG. 4C on a square basis (that is, with respect to each square). Next, the numerical values of squares that overlap with or are superposed on the region of each link are summed up to determine a temporary click ratio predicted value of the region of each link. If a square is not completely superposed on the link region, the value given to the square may be divided between part of the square that is superposed on the link region and part of the square that is not superposed on the link region based on their ratios, so that the value of the superposed part of the square may be calculated to be added to the value of the link region. Then, normalization is performed by multiplying the values of the link regions by a constant so that the total of the values of the link regions is equal to 100%. The results of this calculation are illustrated in FIG. 5. FIG. 5 illustrates click ratio predicted values based on the distribution of contrasts of a Web page and the ease of movement (movability) of a mouse cursor. These predicted values may be understood to be click ratio predicted values that are not based on users' preferences due to link-related keywords. In this embodiment, click ratio predicted values are calculated based on the distribution of contrasts of a Web page and the movability of a mouse cursor, but may also be calculated based on other factors.

A user who views a Web page may click on a link based on the user's preference from words or meaningful pictures displayed on the Web page in some cases or may click on a link based on the distribution of contrasts of the Web page and the movability of a mouse cursor in other cases. In order to extract the user's preference from the measured number of clicks, it is desired to remove as much effect on the measured value (number) of clicks that is not based on the user's preference, due to the distribution of contrasts of the Web page, the movability of a mouse cursor, etc., as possible.

Accordingly, for example, the values of the prominence of links that are closer to real click ratios based on users' preferences may be calculated by subtracting the click ratio predicted values of FIG. 5 from the actual click ratios of FIG. 3C. In this embodiment, the click ratios based on users' preferences are estimated and calculated by subtracting the click ratio predicted values of FIG. 5 from the actual click ratios of FIG. 3C. The calculated values may be hereinafter referred to as the prominence of links (link prominence). The prominence of a link may be used as an index of the degree of attention to the link paid by users based on the users' preference. The link prominence may be calculated by:

$$F_m = \frac{n_m}{\sum_{k=1}^{M} n_k} - \beta \alpha_m, \quad (1)$$

where Fm is the prominence of an $m^{th}$ link in the case where the total number of links is M with m being an integer satisfying $0<m\leq M$, nm is the number of clicks on the $m^{th}$ link, αm is the click ratio predicted value of the $m^{th}$ link, and β is a constant satisfying $0<\beta$.

In this embodiment, a simple subtraction is performed with β being one (β=1). Alternatively, the value of β may be changed so that the subtraction may be performed by multiplying the click ratio predicted value by a desired weight. Other calculation methods may suitably be employed. Further, the value of β may differ between the case of calculating the prominence of links with respect to all users who have accessed the Web page and the case of calculating the prominence of links with respect to a single particular user.

Figure 6:
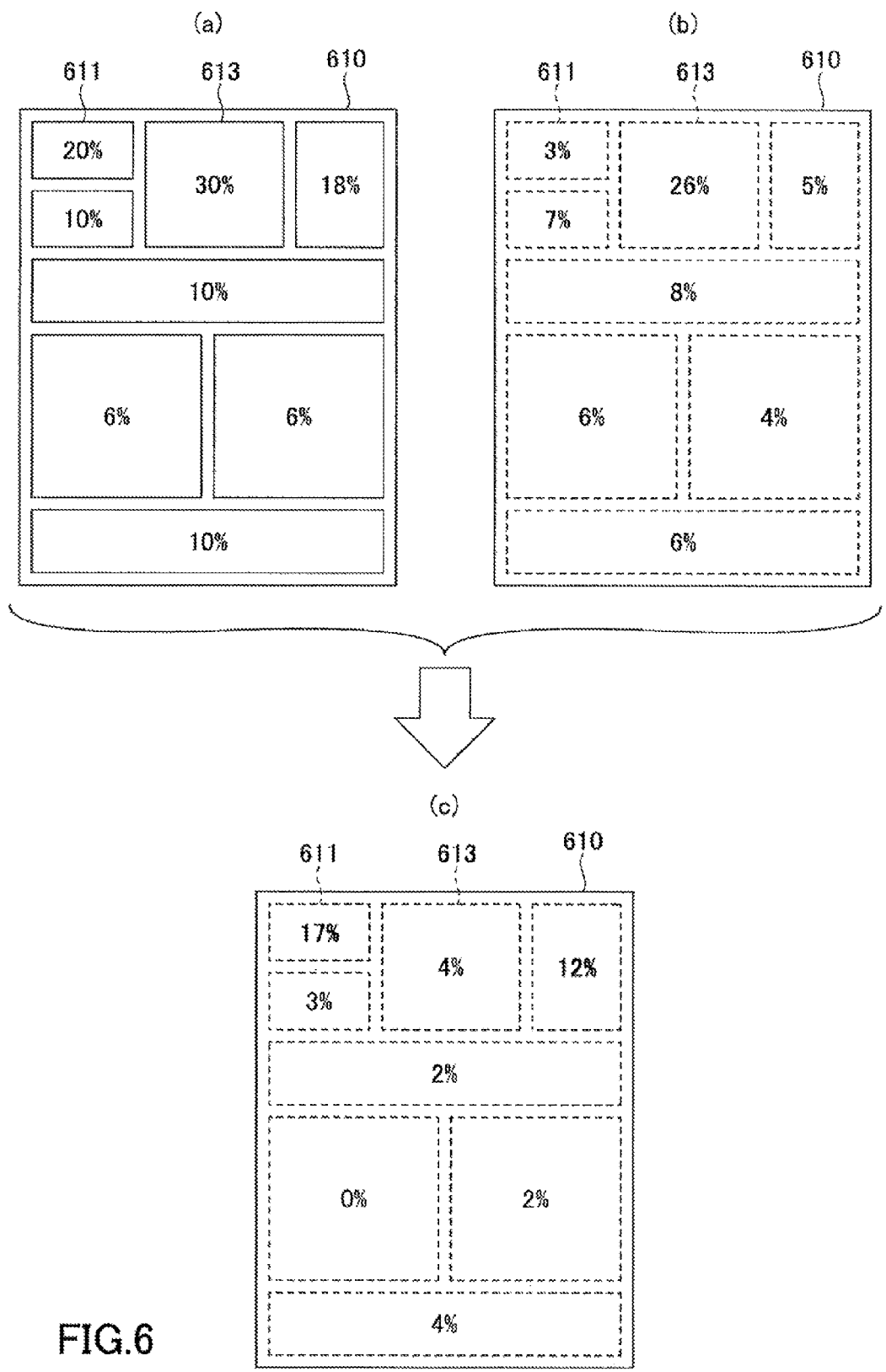
FIG. 6 is a diagram illustrating a technique for determining link prominence according to the embodiment.

FIG. 6 is a diagram illustrating a method of calculating the prominence of a link from the actual access (click) ratio of the link and the access (click) ratio predicted value of the link. In FIG. 6, (a) illustrates the actual click ratio measured with respect to each of the links of a Web page 610, (b) illustrates the click ratio predicted value of each of the links of the Web page 610, calculated in the manner described with reference to FIGS. 4A through 4C and FIG. 5, and (c) illustrates the prominence of each of the links in the case of employing the values calculated (obtained) by subtracting the values of (b) from the values of (a) with respect to the individual links. For the calculation, Eq. (1) described above or other methods may be employed.

Here, it is assumed that the regions of the Web page 610 are assigned with links in the same manner as the Web page 300 of FIG. 3A. Referring to FIG. 6, for example, with respect to a region 611 corresponding to Link 1, the actual click ratio is 20% as illustrated in (a), and the click ratio predicted value is 3% as illustrated in (b). Using these numerical values, the prominence of the link of the region 611 (Link 1) is determined as 17% (20%-3%) as illustrated in (c), illustrating that the link of the region 611 has the highest prominence of all the links in the Web page 610. On the other hand, a region 613 corresponding to Link 3 has a high actual click ratio of 30% as illustrated in (a). However, the click ratio predicted value of the region 613 is 26% as illustrated in (b), so that the prominence of the link of the region 613 (Link 3) is determined as 4%.

The prominence of the content pointed to by a link may be recognized (determined) based on the prominence of the link illustrated in (c) of FIG. 6. Further, as described above, the link prominence with respect to a particular user group may be known by specifying a population (for example, male users). Further, the link prominence with respect to a single particular user may be determined by performing the measurement with respect to the particular user.

Based on this determined link prominence, a prominent link (that is, a link that has drawn attention) may be moved to a position that allows easier clicking. Further, it is also possible to set a layout ("my page") for a particular user. A description is given in detail below of a layout change.

A description is given of determination of keyword importance.

Figure 7:
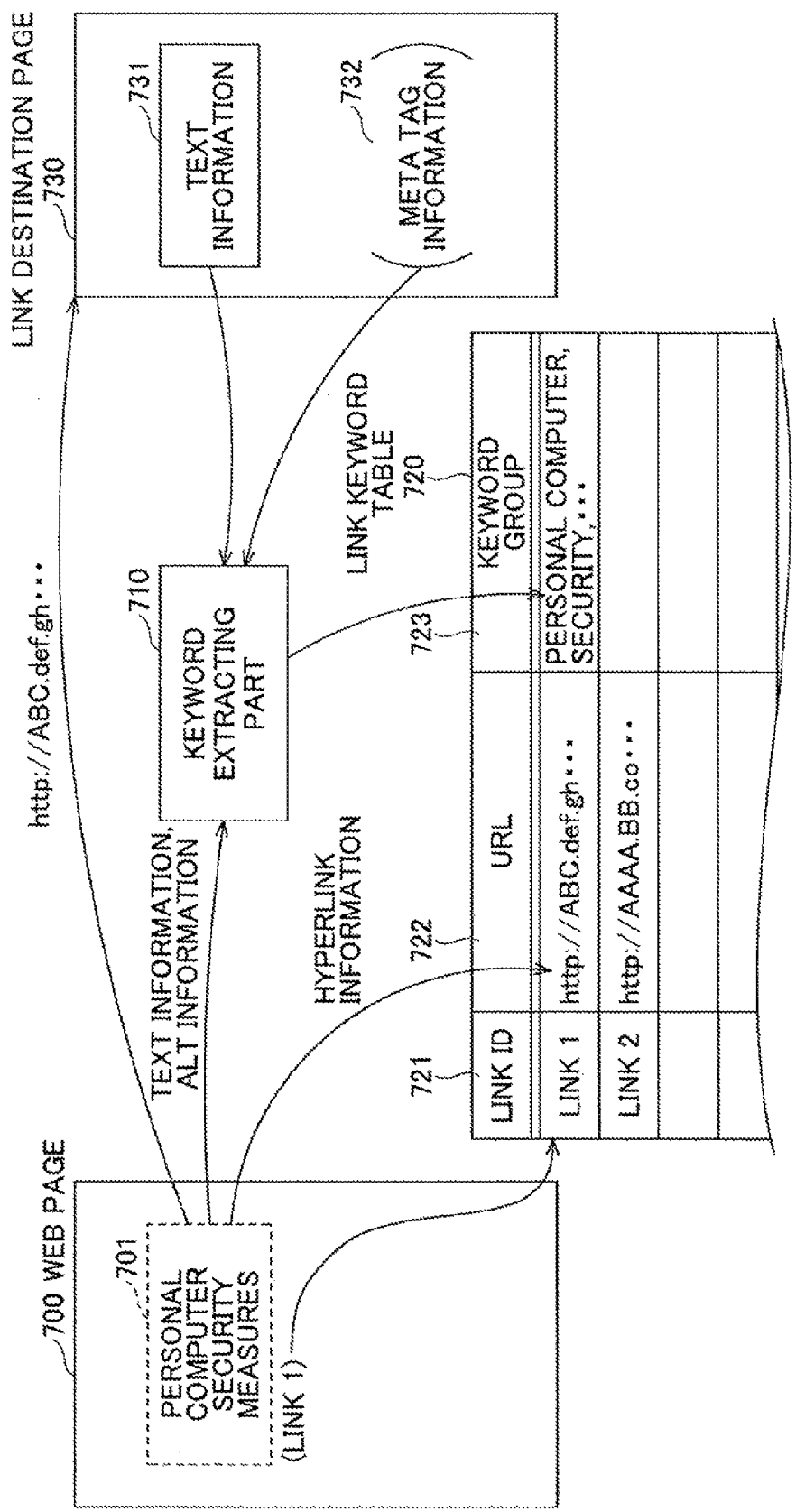
FIG. 7 is a diagram illustrating a technique for extracting keywords according to the embodiment.

FIG. 7 is a diagram illustrating a keyword extraction technique. Referring to FIG. 7, a link 701 (Link 1) is included in a displayed Web page 700. A description is given below of a process for storing a keyword group associated with this link 701 (hereinafter referred to as "Link 1") in a link keyword table 720 (see also FIG. 10) retained in, for example, the storage unit 142 (FIG. 1) or the storage unit 230 (FIG. 2) of the Web content management server 140. Link 1 is expressed as "PERSONAL COMPUTER SECURITY MEASURES" on the Web page 700, and "http://ABC.def.gh . . . " is embedded as hyperlink URL information. Clicking on this hyperlink causes a page 730, which is the link destination of the URL, to be displayed on a display. A keyword extracting part 710 (see also FIG. 10) of the Web content management server 140 writes the URL "http://ABC.def.gh . . . " in an entry corresponding to Link 1 (of a link ID column 721) in a URL column 722. Then, the keyword extracting part 710 may extract one or more keywords from information including a character string of Link 1, for example, from the text information and the information including alt attributes of Link 1, and store the extracted one or more keywords in a corresponding entry in a keyword group column 723. If Link 1 is composed of information other than text, such as a photograph, information such as an alt attribute may be used. Further, the keyword extracting part 710 may analyze text information 731 and/or meta tag information 732 of the link destination page 730, extract one or more keywords from the text information 731 and/or the meta tag information 732, and store the extracted one or more keywords in the corresponding entry in the keyword group column 723.

For example, in order to extract keywords, such an algorithm may be used as conducting a morphological analysis (in the case of, for example, the Japanese language) or text segmentation (in the case of, for example, the English language) and narrowing down the number of candidate keywords based on conjugations and a list of unnecessary words.

Keyword groups corresponding to the links of the Web page 700 are stored in the link keyword table 720 as described above. This link keyword table 720 is used by a keyword importance determination part 830 (described below with reference to FIG. 10) of the Web content management server 140 to give importance to each keyword.

Figure 8A:
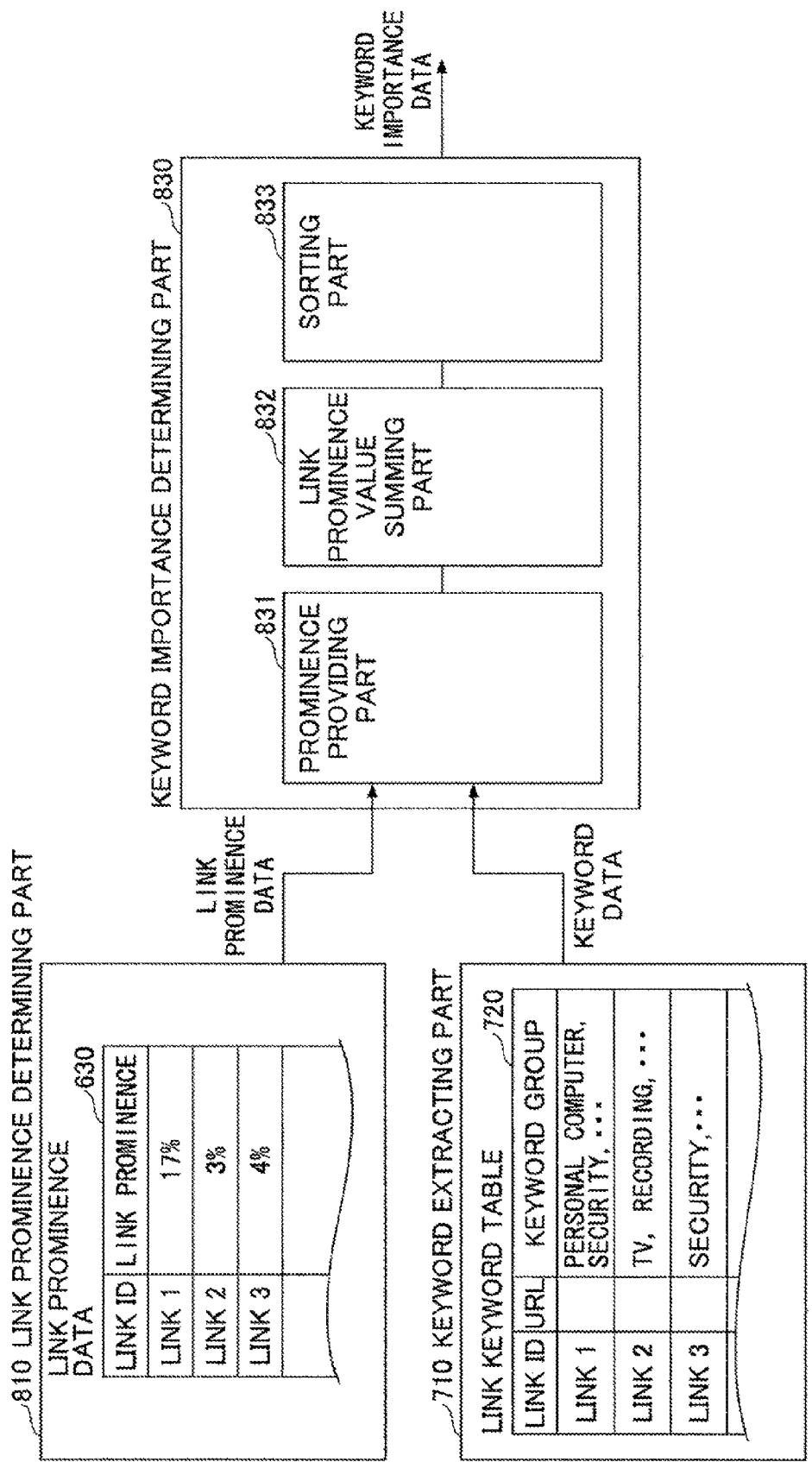
FIG. 8A is a diagram illustrating a technique for determining the importance of the keywords according to the embodiment.

FIG. 8A is a diagram illustrating a technique for determining the importance of a keyword. Referring to FIG. 8A, a link prominence determining part 810 (see also FIG. 10) of the Web content management server 140 determines link prominence on a link ID basis, and outputs link prominence data 630. The link prominence may be determined as described above with reference to FIG. 6.

The keyword extracting part 710 extracts one or more keywords of each link. The keyword extracting part 710 may execute processing as described above with reference to FIG. 7.

To a keyword importance determining part 830 (see also FIG. 10) of the Web content management server 140, the link prominence data 630 are input from the link prominence determining part 810, and the data of the link keyword table 720 are input from the keyword extracting part 710.

The keyword importance determining part 830 includes a prominence providing part 831, a link prominence value summing part 832, and a sorting part 833.

Figure 8B:
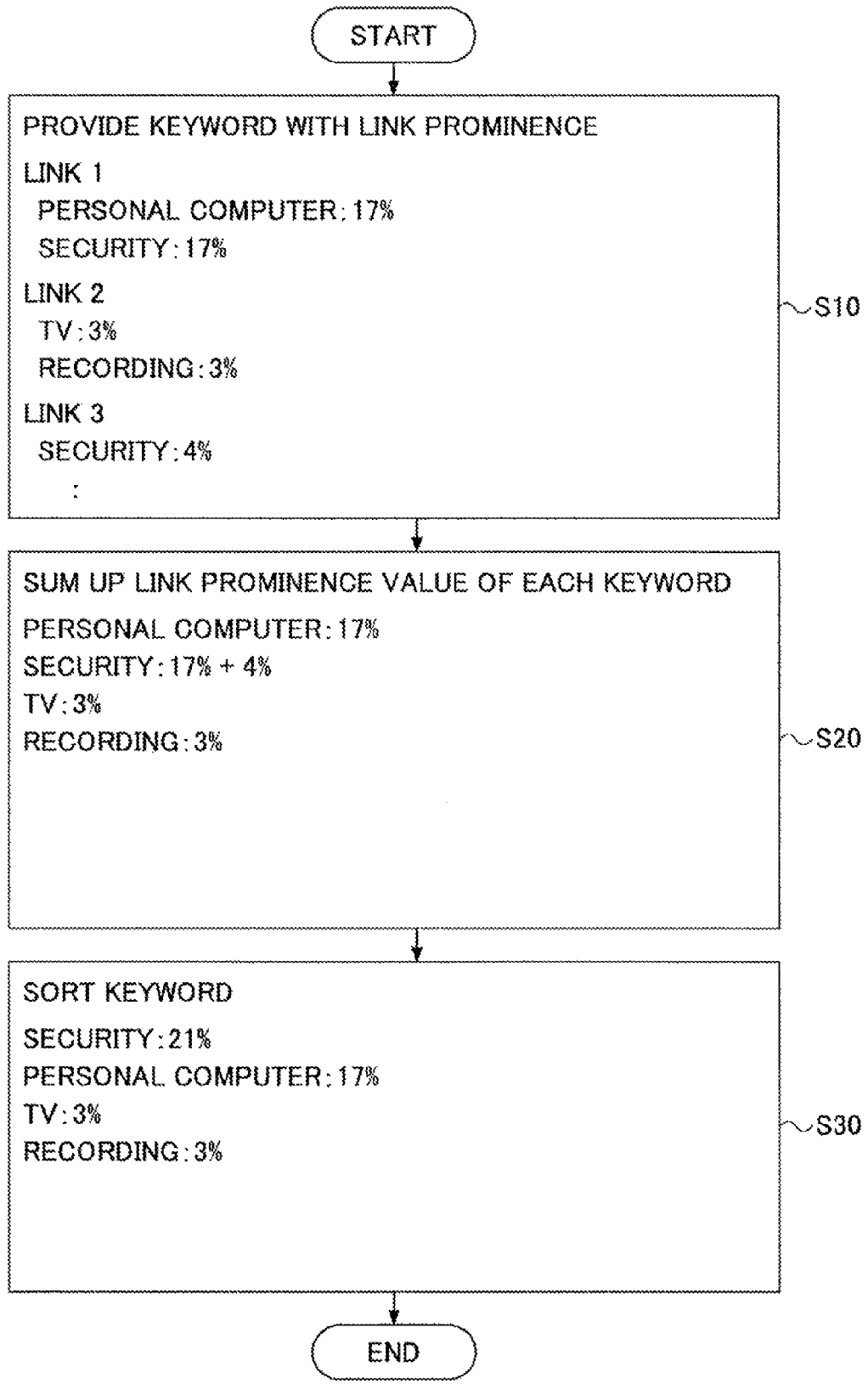
FIG. 8B is a flowchart illustrating a process for determining the importance of the keywords according to the embodiment.

FIG. 8B is a flowchart for illustrating a process executed by the keyword importance determining part 830.

First, in step S10, the prominence providing part 831 of the keyword determining part 830 correlates each keyword with the prominence of a corresponding link using the ID of the link (link ID), thereby giving link prominence to each keyword. Next, in step S20, the link prominence value summing part 832 of the keyword determining part 830 puts the values of link prominence of keywords together on a keyword basis by summing up the values of link prominence of the same keyword. Next, in step S30, the sorting part 833 of the keyword determining part 830 sorts the keywords in descending order of the total of the correlated link prominence values.

As a result of the above-described process, keyword importance data, where keywords are sorted in descending order of their importance, are created and output. The data may be used by a layout changing part 950 (described below with reference to FIG. 10) of the Web content management server 140. The keyword importance data may be obtained for a single particular user, one or more users belonging to a particular group (for example, male users), and/or all users who have accessed a Web page. The link prominence data also may be obtained for various users or user groups in the same manner.

Figure 8C:
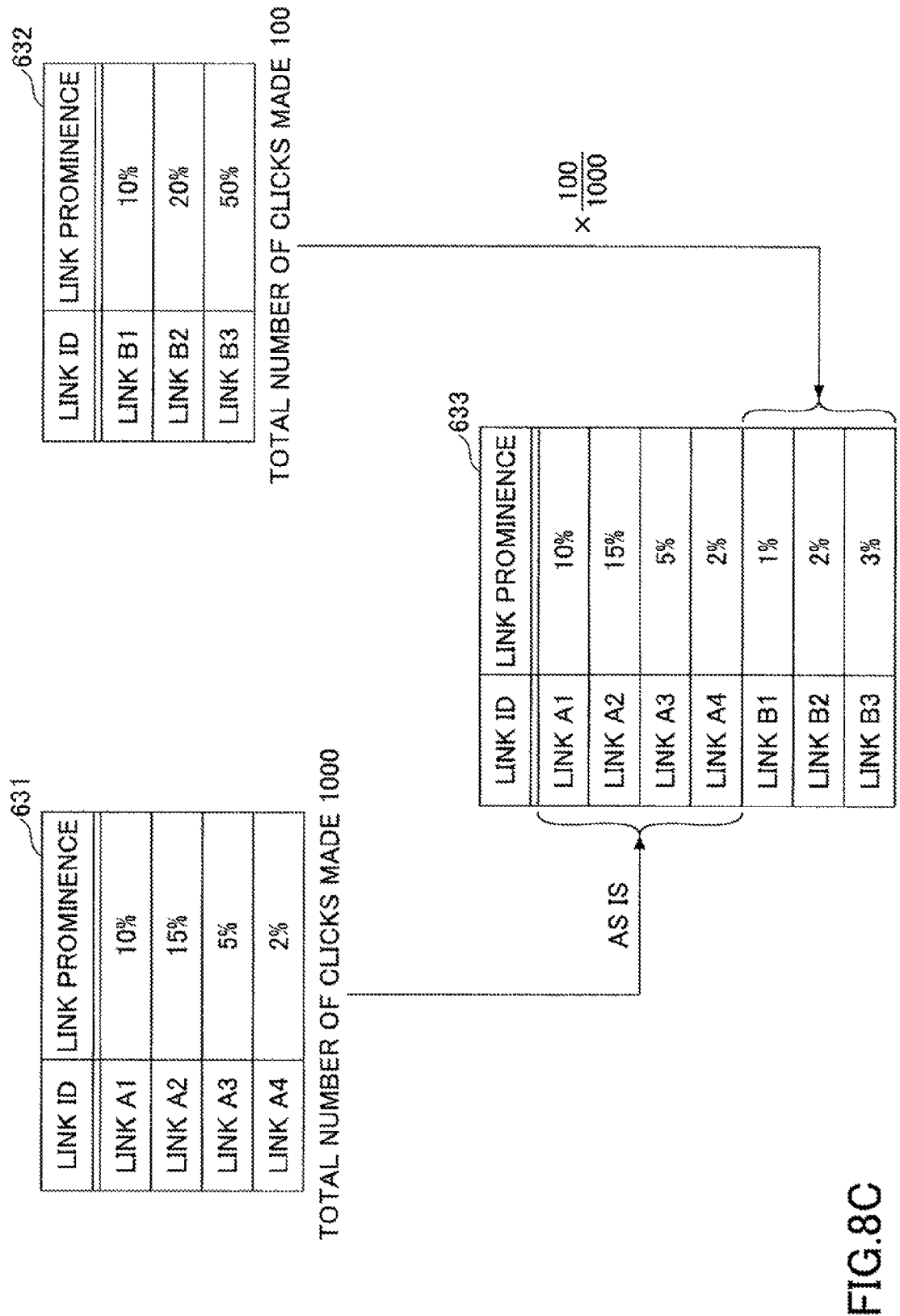
FIG. 8C is a diagram illustrating normalization of the link prominence in the case of handling multiple Web pages according to the embodiment.

FIG. 8C is a diagram illustrating normalization of link prominence in the case of handling multiple Web pages. FIG. 8C illustrates the case of creating link prominence data 633 by integrating link prominence data 631 of Web Page A and link prominence data 632 of Web Page B. It is assumed that the total number of clicks of Web Page A is 1000, and the total number of clicks of Web Page B is 100. In this case, normalization may be performed by multiplying the link prominence of Web Page B by the ratio of the total number of clicks of Web Page B to the total number of clicks of Web Page A, 100/1000, to be adjusted to the link prominence of Web Page A. This operation allows the link prominence data of Web pages A and B to be integrated to be used for subsequent processing.

Figure 9A:
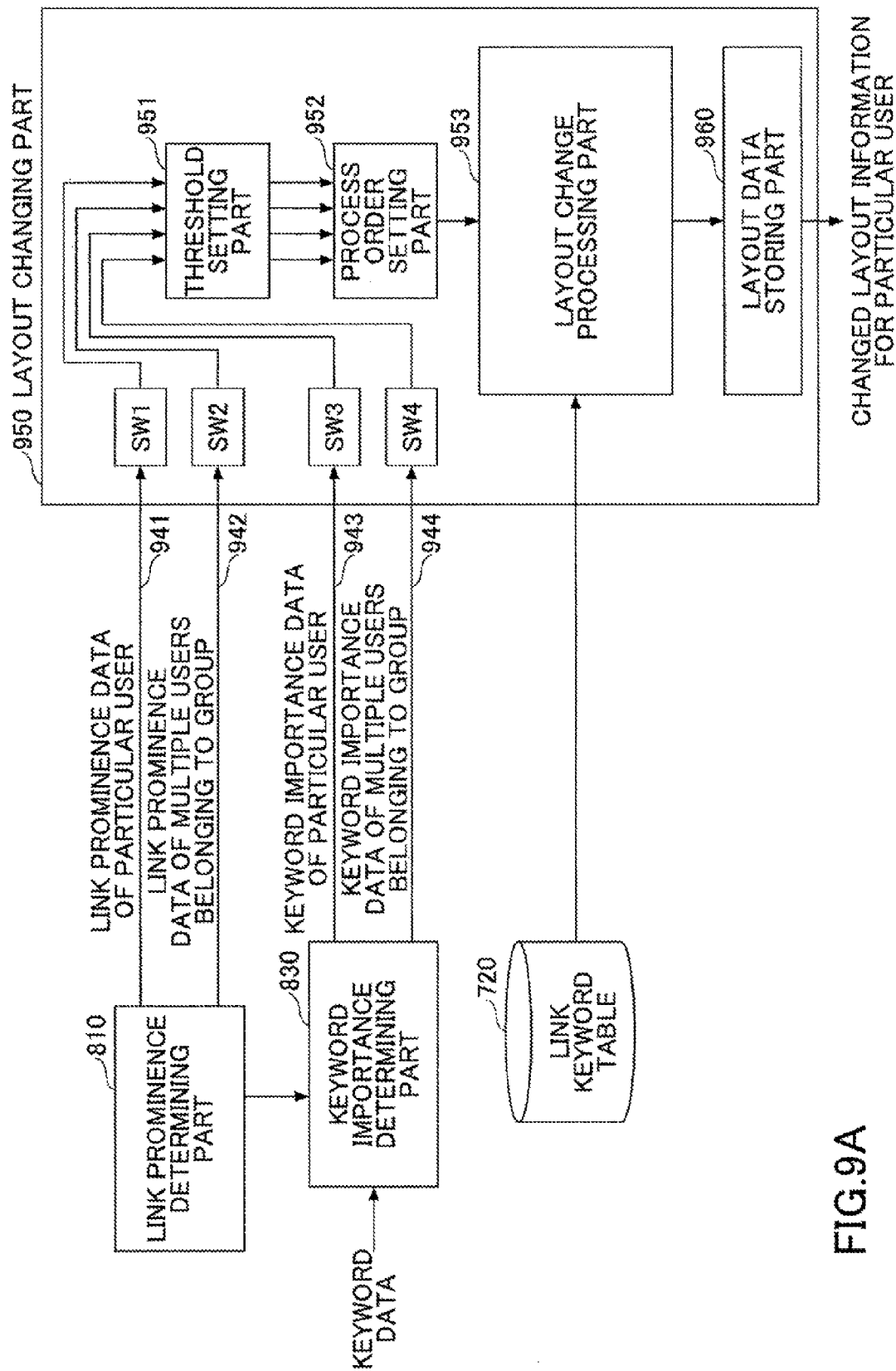
FIG. 9A is a diagram illustrating a process for changing the layout of the Web page according to the embodiment.
Figure 9B:
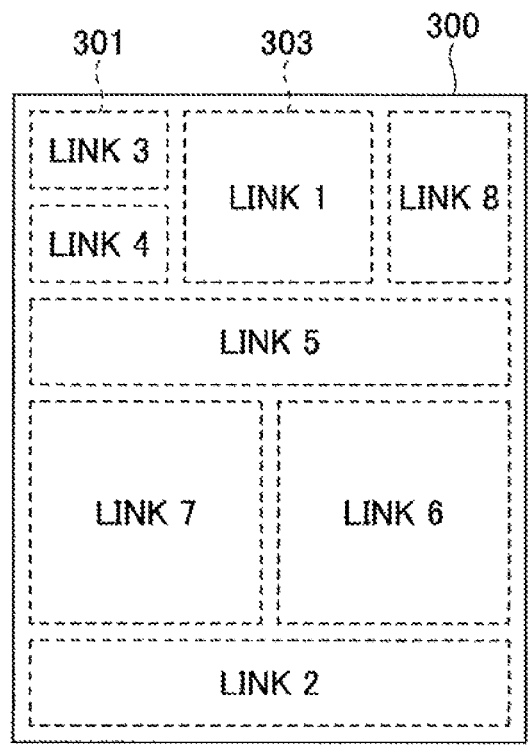
FIG. 9B is a diagram illustrating the result of changing the layout of the Web page according to the embodiment.

Next, a description is given, with reference to FIGS. 9A and 9B, of changing the layout of a Web page using the above-described link prominence data and the keyword importance data according to this embodiment. In changing the layout of a Web page, there is no need for real-time execution of the below-described processing when a particular user accesses the Web page. That is, the Web content management server 140 may sequentially perform processing using log information and event information, and accumulate the processing results of the layout information of the Web page for later use.

FIG. 9A illustrates the case of processing associated with changing the layout of a Web page with respect to a particular user. As described above, the link prominence determining part 810 and the keyword importance determining part 830 may output information related to various users or user groups. In the case illustrated in FIG. 9A, the link prominence determining part 810 may output link prominence data 941 of a particular user and link prominence data 942 of multiple users belonging to a group to the layout changing part 950. Further, the keyword importance determining part 830 may output keyword importance data 943 of a particular user and keyword importance data 944 of multiple users belonging to a group to the layout changing part 950. In FIG. 9A, the link prominence determining part 810 is connected to the layout changing part 950 by two data lines (indicated also by reference numerals 941 and 942). However, the number of data lines may be one, and the two data items (the link prominence data 941 and the link prominence data 942) may be transmitted in series. The same applies to the keyword importance determining part 830.

The layout changing part 950 receives these input data 941, 942, 943 and 944 by switches SW1, SW2, SW3 and SW4, respectively, which have a switching function. For example, the layout changing part 950 may select desired input data by controlling the switching of the switches SW1 through SW4 based on input settings received from a user. For example, turning OFF the switches SW1 and SW3 makes it possible to prevent data related to a particular user from being considered. In this case, the layout of the particular user's Web page reflects the preferences of the multiple users belonging to a group. On the other hand, turning OFF the switches SW2 and SW4 allows the layout of a Web page to strongly reflect the preference of the particular user.

Next, a threshold setting part 951 of the layout changing part 950 may set a threshold for each of the input data 941 through 944 based on, for example, the user-input settings. These thresholds may be used to limit the link prominence data 941 and/or 942 to data having prominence greater than or equal to a certain value and/or to limit the keyword importance data 943 and/or 944 to data having importance greater than or equal to a certain value, and to use the data (greater than or equal to a certain value) for a subsequent layout changing process. Information related to a particular user may be used to determine whether the number of times of viewing a Web page and the number of clicks made are greater than or equal to certain values. In this case, for example, the number of clicks made may be provided to the threshold setting part 951. If these numbers (values) are less than certain values, this means that the data population is small (insufficient in size). The settings may be so provided (determined) that the obtained data 941 through 944 may not be used and the layout may not be changed in such a case.

Thereafter, a process order setting part 952 of the layout changing part 950 may determine the order of processing the input data 941 through 944 based on, for example, the settings input by a user. For example, it is assumed that the data of the users belonging to a group (the data 942 and 944) are processed before the data of the particular user (the data 941 and 943) are processed. In this case, since the data of the particular user are processed later, the preference of the particular user may be strongly reflected in the layout.

If the above-described settings are not provided by a user, default values may be preset or the settings may be provided by an operator who administers the Web page.

Then, a layout change processing part 953 of the layout changing part 950 changes or modifies the layout of the Web page based on the output of the process order setting part 952. The layout change processing part 953 may use the relationship between links and keywords stored in the link keyword table 720 in changing or modifying the layout. For example, the layout change processing part 953 may move links of high prominence and links associated with keywords of high importance to easily accessible positions, thereby interchanging the positions of links.

Further, the layout change processing part 953 may store links and constitute a Web page by selecting a page that suits users' preferences in consideration of the stored links as well. Further, the layout change processing part 953 may cause a search engine to retrieve keywords of high importance and to display the results of the retrieval on an area on the Web page.

A layout data storing part 960 of the layout changing part 950 may store the layout data together with, for example, in correlation with, the user ID of the particular user (or a user group ID) and the keywords preferred by the particular user (or a particular user group).

FIG. 9B is a diagram illustrating the Web page 300 of FIG. 3A whose layout has been changed (or modified) by the above-described layout changing process. For example, it is assumed that the Web page 300 has the link prominence as illustrated in (c) of FIG. 6. Referring to (c) of FIG. 6, Link 1 has a high link prominence of 17%, while Link 3 has a low link prominence of 4%. As a result, in FIG. 9B, the layout of the Web page 300 is changed so that the positions of Link 1 and Link 3 are interchanged to have Link 1 positioned in the region 303 and to have Link 3 positioned in a region 301. Referring to FIG. 5, the region 303 has a high click ratio predicted value (26%), and is easily clickable. (See also (b) of FIG. 6, where the region 613 corresponding to the region 303 has a high click ratio predicted value of 26%.) Link 1, which is the most prominent on the Web page 300, is placed in this easily clickable region 303. As a result of this layout change, a more user-friendly "my" Web page is constructed, and this "my" Web page may be provided to a corresponding user.

If it is desired to have a fixed region in the layout, the layout change processing part 953 may identify the region in order to prevent the layout from being changed with respect to the region.

A description is given of a configuration of the whole system 100.

Figure 10:
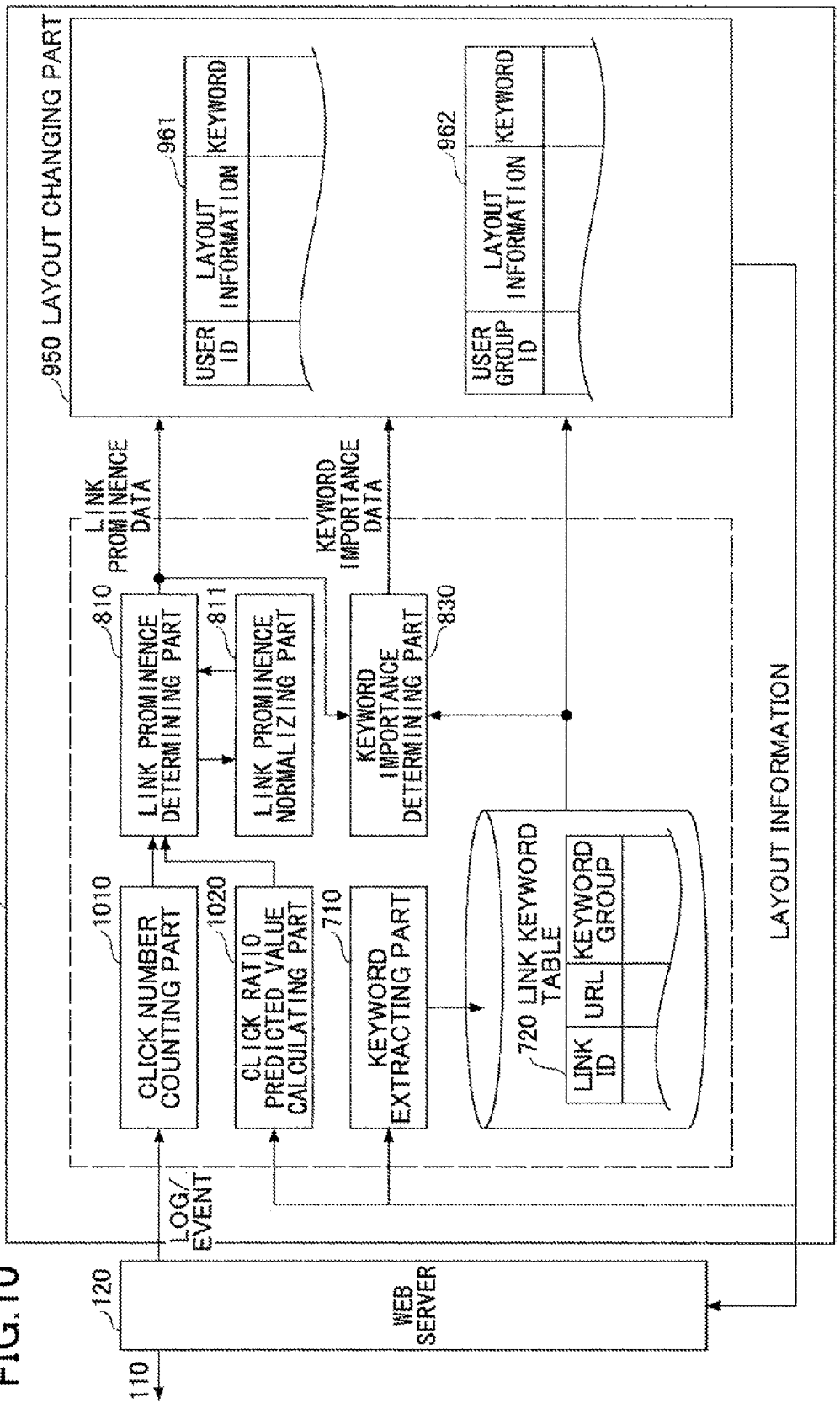
FIG. 10 is a block diagram illustrating a functional configuration of the server according to the embodiment.

FIG. 10 is a block diagram illustrating a functional configuration of the Web content management server 140 according to this embodiment. Referring to FIG. 10, the Web content management server 140 includes a click number counting part 1010, a click ratio predicted value calculating part 1020, the keyword extracting part 710 (FIG. 7 and FIG. 8A), the link prominence determining part 810 (FIG. 8A and FIG. 9A), a link prominence normalizing part 811, the keyword importance determining part 830 (FIG. 8A and FIG. 9A), and the layout changing part 950 (FIG. 9A), which may be implemented by the CPU 210 (FIG. 2) executing a program according to this embodiment. The Web content management server 140 may contain the link keyword table 720.

The log information and the event information output by the Web server 120 are input to the click number counting part 1010 of the Web content management server 140. The click number counting part 1010 counts the numbers of clicks on links on a Web page on a link basis. These numbers of clicks are transmitted to the link prominence determining part 810.

The click ratio predicted value calculating part 1020 calculates the click ratio predicted values of links on a link basis using the layout information fed from the layout changing part 950. These predicted values are transmitted to the link prominence determining part 810.

In response to reception of these inputs, the link prominence determining part 810 determines the prominence of links on a link basis. The link prominence data determined by the link prominence determining part 810 are output to be input to the layout changing part 950. The link prominence data may be used as data for Web designing in constructing a Web page.

The link prominence normalizing part 811 performs a process for integrating, for example, the link prominence data obtained from multiple Web pages. For example, the link prominence normalizing part 811 performs the above-described processing as illustrated in FIG. 8C to adjust the values of the link prominence data and integrate the link prominence of links on the Web pages, using the total number of clicks of each Web page. The integrated link prominence data are returned to the link prominence determining part 810.

The keyword extracting part 710 executes the process illustrated in FIG. 7 using the Web layout information and the data of the actual Web page, thereby extracting one or more keywords of each link and storing the keywords in the link keyword table 720.

The keyword importance determining part 830 determines the importance of keywords on a keyword basis using the information of the link keyword table 720 and the link prominence data. An example of this processing is illustrated with reference to FIGS. 8A and 8B.

The layout changing part 950 changes the layout of the Web page using the link prominence data, the keyword importance data, and the information of the link keyword table 720. An example of this processing is illustrated with reference to FIG. 9A. Web layout data 961 containing layout information for a particular user and Web layout data 962 containing layout information for a user group may be stored in the layout changing part 950.

The layout information of the Web page changed or modified in the layout changing part 950 may be used in the Web server 120, the click ratio predicted value calculating part 1020, and the keyword extracting part 710.

Figure 11:
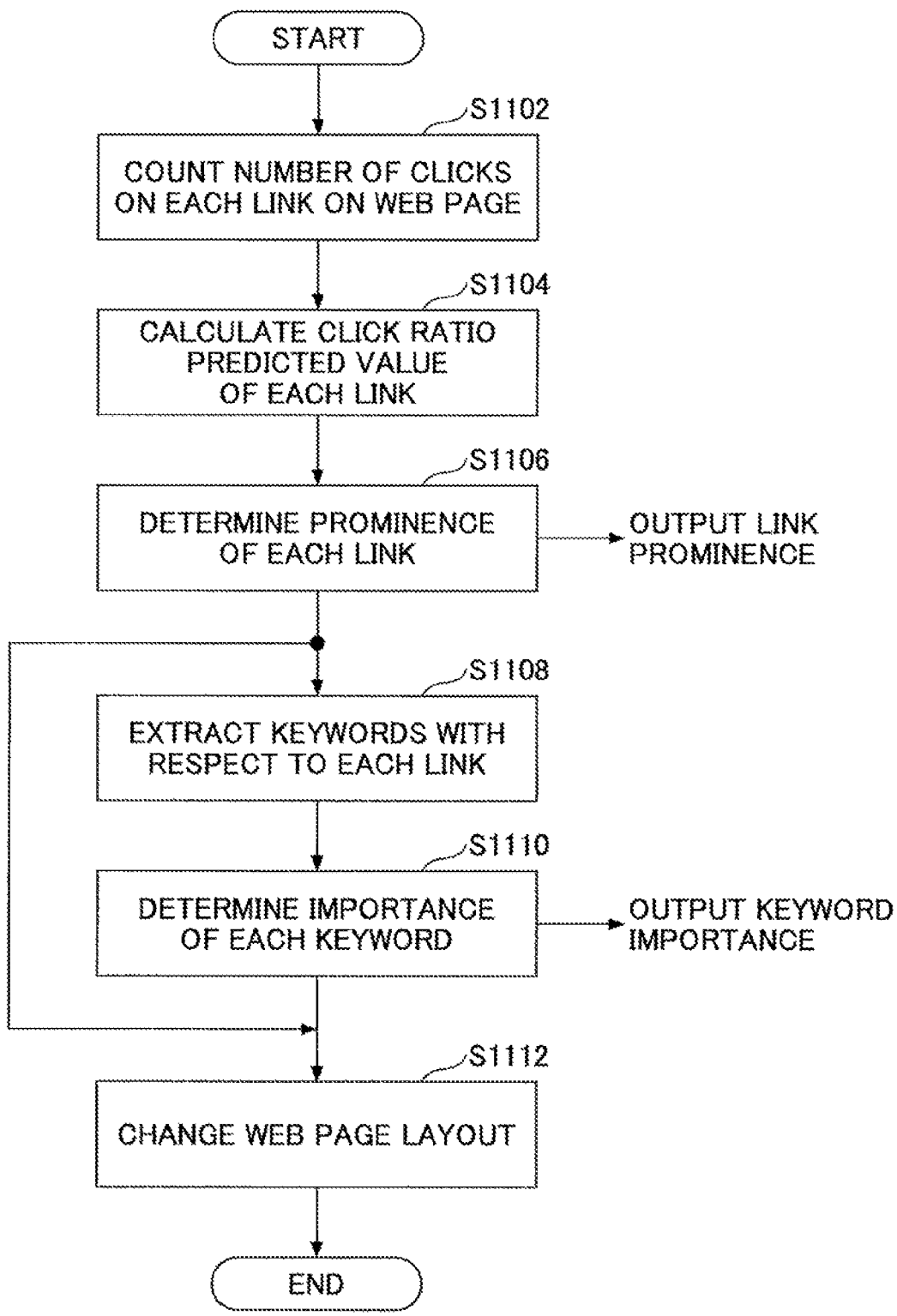
FIG. 11 is a flowchart of an information processing method according to the embodiment.

FIG. 11 is a flowchart of an information processing method according to this embodiment. The order of performing the steps (processes) of the information processing method illustrated in FIG. 11 may be suitably changed within the scope of the embodiment.

In step S1102, the number of clicks made on each of links on a Web page by a user is counted.

In step S1104, the click ratio predicted value is calculated for each of the links. This calculation may be performed based on the contrast distribution of the Web page and/or the movability of a mouse cursor.

In step S1106, the prominence of each of the links is determined. This prominence may be determined based on the actual number of clicks and the click ratio predicted value of each of the links on the Web page. The prominence of each of the links may be output to the outside of the Web content management server 140.

In step S1108, one or more keywords may be extracted with respect to each of the links. Keywords may be extracted from the text information and/or the alt attributes of the links. Keywords may also be extracted by analyzing the text information and/or meta tag information of a link destination page.

In step S1110, the importance of each keyword is determined. This information of the keyword importance may be output to the outside of the Web content management server 140.

In step S1112, the layout of the Web page may be changed or modified. The layout may be changed or modified based on at least one of the link prominence of each link and the importance of each keyword.

Real-time execution is not necessarily required for the processes for obtaining the link prominence and the keyword importance and for changing the layout of a Web page described in this embodiment. That is, the Web content management server 140 may execute processing with desired timing (at a desired time) or at desired intervals and store the results of the processing, using information including the log information and/or the event information associated with access to the Web page. Then, the Web content management server 140 may read the link prominence data, the keyword importance data, the Web layout information, etc., from, for example, the storage unit 142 (FIG. 1) and use the read data and information with desired timing (at a desired time).

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

What is claimed is:

1. A server, comprising:
   a hardware processor; and
   a memory storing a program that, when executed by the hardware processor, causes the server to
   count a number of operations on each of a plurality of links on a Web page divided into a plurality of areas;
   calculate a predicted value of a ratio of the operations of said each of the plurality of links based on a value given to one or more of the plurality of areas of the Web page forming said each of the plurality of links;
   determine a prominence of said each of the plurality of links based on the number of the operations and the predicted value of the ratio of the operations; and
   normalize the prominence of said each of the plurality of links on the Web page and a prominence of a link on another Web page by weighting the prominence of said each of the plurality of links on the Web page and the prominence of the link on said another Web page in accordance with the number of the operations on said each of the plurality of links on the Web page and a number of operations on the link on said another Web page.

2. The server as claimed in claim 1,
   wherein the program, when executed by the hardware processor, further causes the server to
   extract one or more keywords associated with said each of the plurality of links; and
   determine an importance of each of the keywords based on the prominence of said each of the plurality of links and the keywords.

3. The server as claimed in claim 2, wherein the program, when executed by the hardware processor, causes the server to extract the one or more keywords associated with said each of the plurality of links from at least one of:
   information containing a character string of said each of the plurality of links; and
   a content pointed to by said each of the plurality of links.

4. The server as claimed in claim 1, wherein the program, when executed by the hardware processor, causes the server to calculate the prominence of said each of the plurality of links based on $$F_m = \frac{n_m}{\sum_{k=1}^{M} n_k} - \beta \alpha_m$$

where Fm is the prominence of an $m^{th}$ link in a case where a total number of links is M with m being an integer satisfying $0 < m \le M$, nm is the number of the operations on the $m^{th}$ link, am is the predicted value of the ratio of the operations of the $m^{th}$ link, and β is a constant satisfying $0 < \beta$.

5. The server as claimed in claim 1, wherein the program, when executed by the hardware processor, causes the server to determine the predicted value of the ratio of the operations of said each of the plurality of links based on at least one of an area, a position, and a ratio of contrast to a background of said each of the plurality of links on the Web page.

6. The server as claimed in claim 1, wherein the operations on said each of the plurality of links are performed by one or more users.

7. A method of processing Web access information, comprising:
   counting, by a computer processor, a number of operations on each of a plurality of links on a Web page divided into a plurality of areas;
   calculating, by the computer processor, a predicted value of a ratio of the operations of said each of the plurality of links based on a value given to one or more of the plurality of areas of the Web page forming said each of the plurality of links;
   determining, by the computer processor, a prominence of said each of the plurality of links based on the number of the operations and the predicted value of the ratio of the operations; and
   normalizing, by the computer processor, the prominence of said each of the plurality of links on the Web page and a prominence of a link on another Web page by weighting the prominence of said each of the plurality of links on the Web page and the prominence of the link on the other Web page in accordance with the number of the operations on said each of the plurality of links on the Web page and a number of operations on the link on the other Web page.

8. The method as claimed in claim 7, further comprising:
   extracting, by the computer processor, one or more keywords associated with said each of the plurality of links; and
   determining, by the computer processor, an importance of each of the keywords based on the prominence of said each of the plurality of links and the keywords.

9. The method as claimed in claim 8, wherein said extracting extracts the one or more keywords associated with said each of the plurality of links from at least one of:
   information containing a character string of said each of the plurality of links; and
   a content pointed to by said each of the plurality of links.

10. The method as claimed in claim 7, wherein said determining calculates the prominence of said each of the plurality of links based on $$F_m = \frac{n_m}{\sum_{k=1}^{M} n_k} - \beta \alpha_m$$

where Fm is the prominence of an $m^{th}$ link in a case where a total number of links is M with m being an integer satisfying $0 < m \le M$, nm is the number of the operations on the $m^{th}$ link, am is the predicted value of the ratio of the operations of the $m^{th}$ link, and β is a constant satisfying $0 < \beta$.

11. The server as claimed in claim 7, wherein said calculating determines the predicted value of the ratio of the operations of said each of the plurality of links based on at least one of an area, a position, and a ratio of contrast to a background of said each of the plurality of links on the Web page.

12. The method as claimed in claim 7, wherein the operations on said each of the plurality of links are performed by one or more users.

13. A non-transitory computer-readable recording medium having an executable program recorded thereon, wherein the program instructs a computer processor to perform:
   counting a number of operations on each of a plurality of links on a Web page divided into a plurality of areas;
   calculating a predicted value of a ratio of the operations of said each of the plurality of links based on a value given to one or more of the plurality of areas of the Web page forming said each of the plurality of links;

determining a prominence of said each of the plurality of links based on the number of the operations and the predicted value of the ratio of the operations; and normalizing the prominence of said each of the plurality of links on the Web page and a prominence of a link on another Web page by weighting the prominence of said each of the plurality of links on the Web page and the prominence of the link on the other Web page in accordance with the number of the operations on said each of the plurality of links on the Web page and a number of operations on the link on the other Web page.

14. The non-transitory computer-readable recording medium as claimed in claim 13, wherein the program instructs the computer processor to further perform:

extracting one or more keywords associated with said each of the plurality of links; and determining an importance of each of the keywords based on the prominence of said each of the plurality of links and the keywords.

15. The server as claimed in claim 1, further comprising:

a layout changing part configured to, in response to detection of a first link having the prominence higher than the prominence of a second link among the plurality of links on the Web page, interchange a position at which the first link is operated and a position at which the second link is operated.

16. The method as claimed in claim 7, further comprising:

interchanging, by the computer processor, in response to detection of a first link having the prominence higher than the prominence of a second link among the plurality of links on the Web page, a position at which the first link is operated and a position at which the second link is operated.

17. The non-transitory computer-readable recording medium as claimed in claim 13, wherein the program instructs the computer processor to further perform:

interchanging, in response to detection of a first link having the prominence higher than the prominence of a second link among the plurality of links on the Web page, a position at which the first link is operated and a position at which the second link is operated.

* * * * *